US005340984A

United States Patent [19]

Evans

[11] Patent Number: 5,340,984

[45] Date of Patent: Aug. 23, 1994

[54] NON-CONTACT INTERCONNECT FOR FOCAL PLANE ARRAYS

[75] Inventor: Scott B. Evans, Carlsbad, Calif.

[73] Assignee: SKW Corporation, Arlington, Va.

[21] Appl. No.: 885,609

[22] Filed: May 19, 1992

[51] Int. Cl.$^5$ .................................... G01J 5/06

[52] U.S. Cl. .................................... 250/332; 250/352; 250/370.08; 250/370.15

[58] Field of Search .................... 250/370.15, 352, 332, 250/338.4, 370.08, 349

[56] References Cited

U.S. PATENT DOCUMENTS

| | | | |
|---|---|---|---|
| 4,142,101 | 2/1979 | Yin | 250/363.01 |
| 4,311,906 | 1/1982 | Felix et al. | 250/349 |
| 4,752,688 | 6/1988 | Tosswill | 250/330 |
| 4,924,096 | 5/1990 | Mroczkowski et al. | 250/338.4 |
| 4,990,766 | 2/1991 | Simms et al. | 250/214 VT |
| 5,015,858 | 5/1991 | Augustine et al. | 250/332 |
| 5,118,946 | 6/1992 | Smith | 250/332 |
| 5,126,568 | 6/1992 | Durst | 250/349 |

*Primary Examiner*—Carolyn E. Fields
*Attorney, Agent, or Firm*—Rothwell, Figg, Ernst & Kurz

[57] ABSTRACT

A focal plane array uses non-contact electrical interconnects instead of indium bumps. The interconnect bump comprises one or more vacuum microelectronics devices. The non-contact interconnect provides no themally conductive path between the detector and readout. For thermal detectors, the detector is not thermally connected to the readout and thus undergoes larger temperature changes in response to infrared radiation. For cryogenically cooled detectors, the detector and readout each have separate heat sinks with separate temperature controls. The readout may thus be operated at a higher temperature than the detector. The non-contact interconnect eliminates heat leakage from the readout to the detector enabling a thermal gradient to be maintained simultaneously with a net savings in refrigerator power. The non-contact interconnect also allows for differences in thermal expansion between the detector and the readout and thus increases the reliability of the focal plane array.

12 Claims, 7 Drawing Sheets

NON-CONTACT INTERCONNECT FOR FOCAL PLANE ARRAYS

BACKGROUND OF THE INVENTION

1. Field of the Invention

This invention relates generally to focal plane array (FPA) technology. In particular, the present invention has utility for any spectral band FPA that benefits from the physical separation of the detector array from the readout circuit, e.g., pyroelectric and cryogenically cooled infrared FPAs.

2. Background Art

A hybrid FPA is comprised of an array of detectors and a readout circuit for sensing the photon or thermally generated charge on the detectors. Conventional FPAs use physically contacting interconnects, such as indium bumps, to connect the detector elements to the readout circuit. There are several undesirable consequences of this physical contact.

The indium bumps create a high thermal conductance between the detector and readout substrates which force them to operate at near the same temperature. The substrates must be aligned and bonded (hybridized) in a difficult and low yield process. The indium bump bonds also suffer poor reliability particularly for materials of different thermal expansion coefficients.

Thus, there is a great need for an interconnect for focal plane arrays which does not create a high thermal conductance between the detector and readout substrates. An interconnect for focal plane arrays is also needed which substantially eliminates poor reliability caused by structural failures.

SUMMARY OF THE INVENTION

In accordance with the present invention, a focal plane array is disclosed having a non-contact interconnection means for interconnecting the detector and readout which has no thermally conductive path between the detector and readout. For thermal detectors, the detector is essentially free standing being suspended from its edges. For cooled detectors, instead of using the readout as a heat sink for the detector, the detector and readout each has its own heat sink with its own temperature control. The readout may thus be operated at a higher temperature than the detector. The heat sink for the detector is made in such a way as to not obscure the active area of the detector, that is, it surrounds the active area of the detector. The non-contact interconnect means is employed to eliminate heat leakage from the readout to the detector thereby enabling a thermal gradient to be maintained simultaneously with a net savings in refrigerator power.

The non-contact interconnect means comprises, in one embodiment, one or more vacuum microelectronics devices (VMDs) which produce an electron beam current when biased so that electrons tunnel from the VMD cathode. The basic VMD structure consists of a sharply pointed cathode tip in the vicinity of a surrounding gate electrode. When the VMD cathodes are fabricated on the detector array, the electron beam current is modulated by the infrared ("IR") generated electrons from each detector. When the VMD cathodes are fabricated on the readout, the electron beams serve to reset each detector of the array producing a displacement current proportional to the IR generated charge.

By eliminating the physical contact between the detector and readout, an FPA is provided wherein the detector and readout operate at different temperatures, only gross alignment between the substrates is required, and the poor yield and reliability problems, due to failure of the indium bump bonds, are eliminated.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

Figure 3:
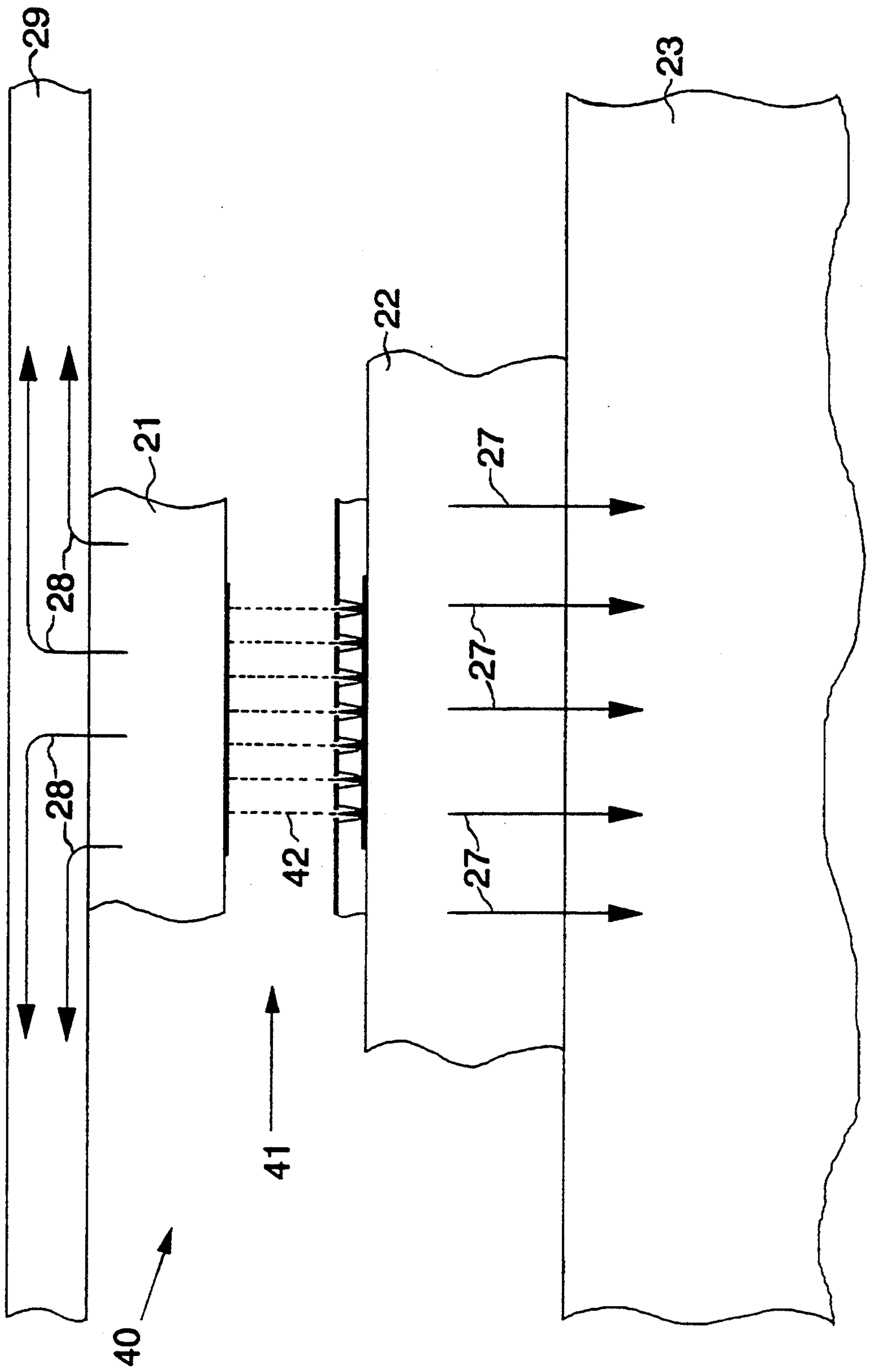
Figure 4:
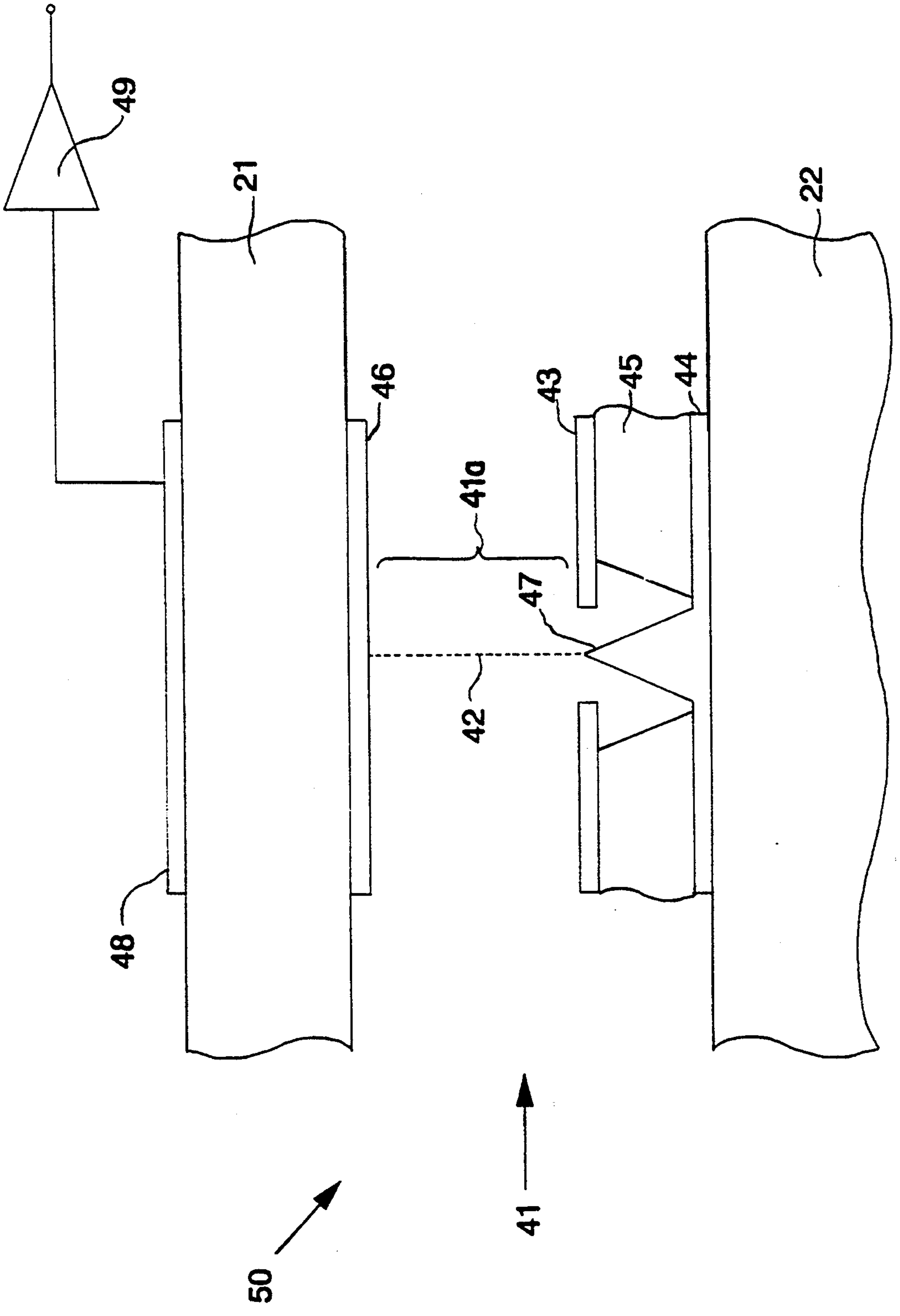
Figure 5:
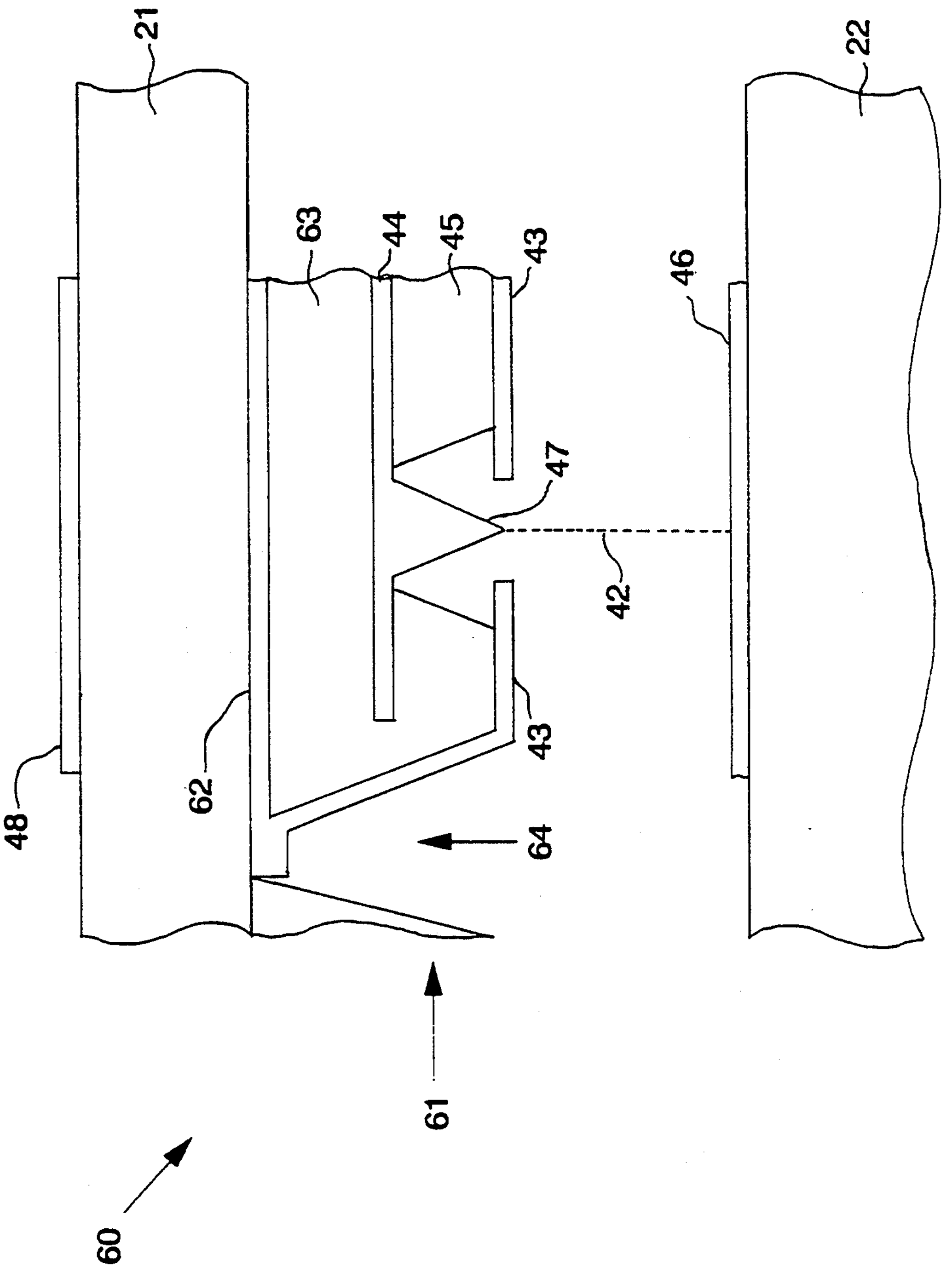

FIG. *2a* is an enlarged side view of a focal plane array with a cathode of a non-contact interconnect means constructed on a detector in accordance with the principles of the present invention;

FIG. *2b* is an enlarged side view of a focal plane array with the cathode of the non-contact interconnect means constructed on the detector with a detector heat sink in accordance with the principles of the present invention;

FIG. *2c* is a top view of a focal plane array in accordance with the present invention;

FIG. 3 is an enlarged side view of a focal plane array with the cathode of the non-contact interconnect means constructed on the readout with a detector heat sink in accordance with the principles of the present invention;

FIG. 4 is an enlarged side view of a single non-contact interconnect VMD in the configuration of FIG. 3; and FIG. 5 illustrates a side view of a focal plane array according to an alternate embodiment of the present invention.

DETAILED DESCRIPTION OF THE PREFERRED EMBODIMENTS

Figure 1:
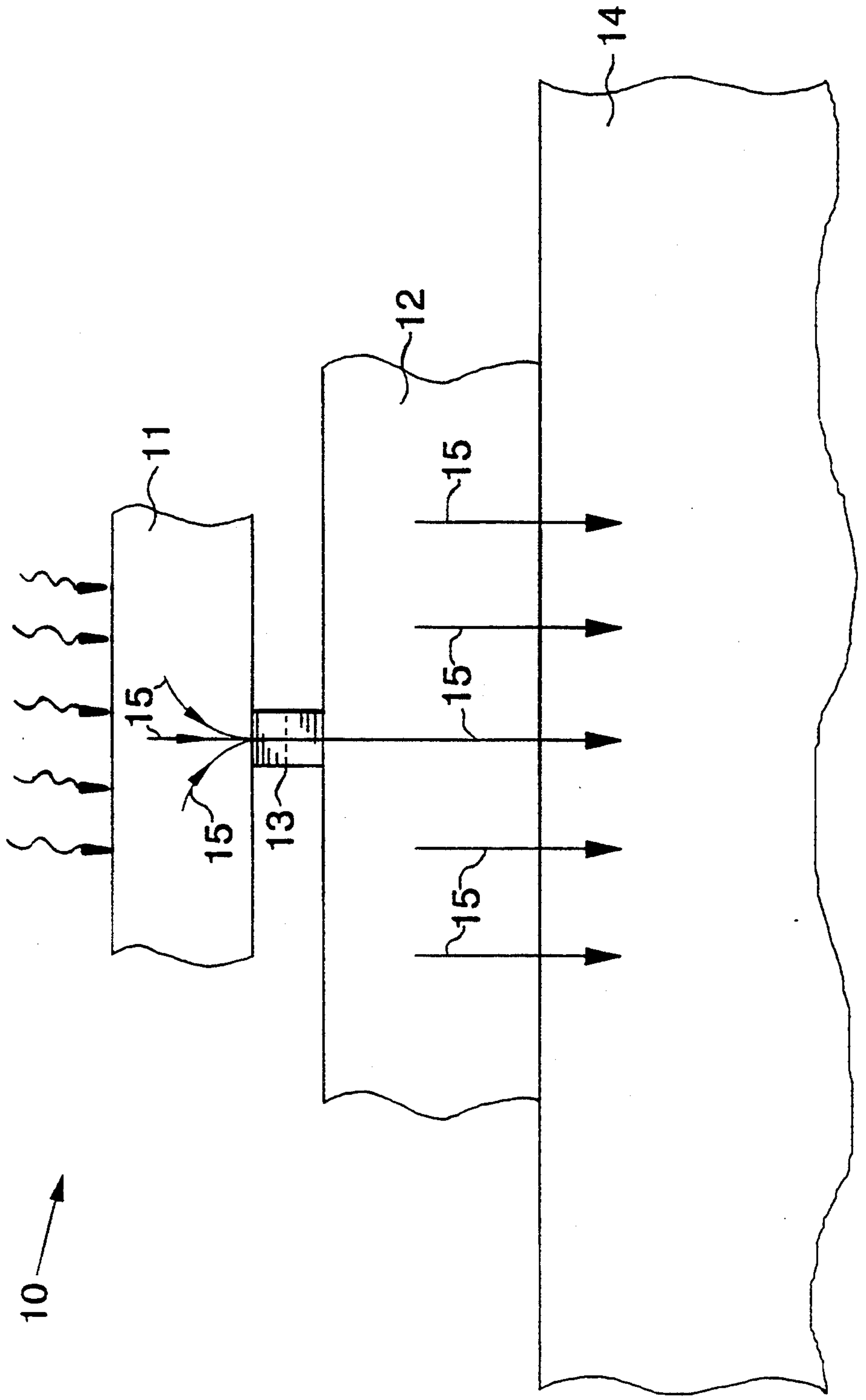
FIG. 1 PRIOR ART
FIG. 1 is an enlarged side view of a slice through a conventional focal plane array showing a portion of a detector, a portion of a readout, and an indium bump interconnect therebetween.

Referring now to FIG. 1, there is shown an enlarged side view of a slice through a portion of a conventional focal plane array 10. FIG. 1 shows a portion of one detector 11 from the array 10 that comprises a plurality of such detectors 11. The detector 11 may be a blocked impurity band (BIB), photovoltaic, photoconductive, Schottky barrier, pyroelectric, or bolometric detector material. The detector 11 normally detects infrared radiation from above as seen in FIG. 1. An electrical charge developed on the detector 11 is collected by a readout 12. In the conventional focal plane array 10, the charge is coupled from the detector 11 to the readout 12 by an indium bump interconnect 13.

Heat generated in the readout 12 is thermally coupled to the coldest stage of a refrigerator used to cool the focal plane array 10. FIG. 1 shows the readout 12 disposed on a readout heat sink 14 and the heat flow lines are indicated by arrows 15. The indium bump interconnect 13 that interconnects the detector 11 to the readout 12 has a high thermal conductance. Accordingly, the detector 11, the indium bump interconnect 13, and the readout 12 all operate at substantially the same temperature. More particularly, the readout 12 acts as the heat sink for the detector 11.

For example, detector 11 made of a bolometric material produces an electrical signal proportional to its change in temperature resulting from IR exposure. When connected to the readout 12 by a high thermal conductance indium bump 13, the detector cannot undergo a large temperature change, thus its response is limited by the indium bump interconnect.

Also, typically the desired operating temperature for a BIB detector 11 is approximately 10–20 degrees Kelvin. Unfortunately, this temperature is too cold for the readout 12 which typically provides optimum performance at a temperature above 40 degrees Kelvin. The noise generated by the readout 12 typically increases monotonically as the temperature thereof is decreased for temperatures below about 50 degrees Kelvin. Also, the heat generated by the readout 12 places a significant load on the refrigerator. Thus, conventional interconnect arrangements as illustrated in FIG. 1 result in a focal plane array 10 that is limited by the noise and power dissipation of the readout 12.

The indium bump 13 is also a potential point of failure in the electrical connection between the detector 11 and the readout 12. For example, in focal plane arrays where the detector 11 is made of mercury cadmium telluride and the readout 12 is made of silicon, the two materials contract to different sizes when cooled to an operating temperature which typically is 77 degrees Kelvin. This creates stress across the indium bump 13 that can cause detector damage, stress related detector noise, and indium bump failure.

Figure 2A:
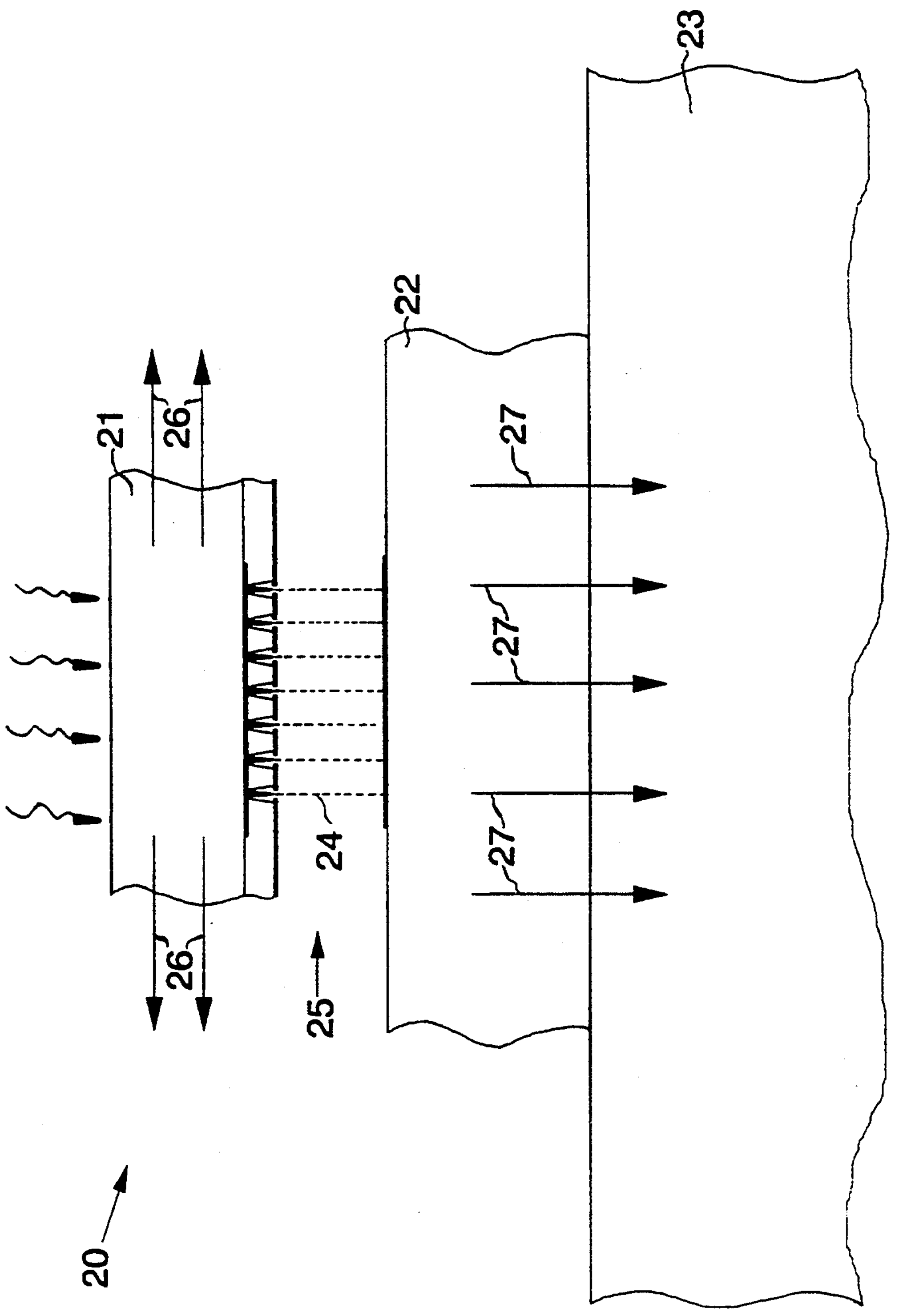
Figure 2B:
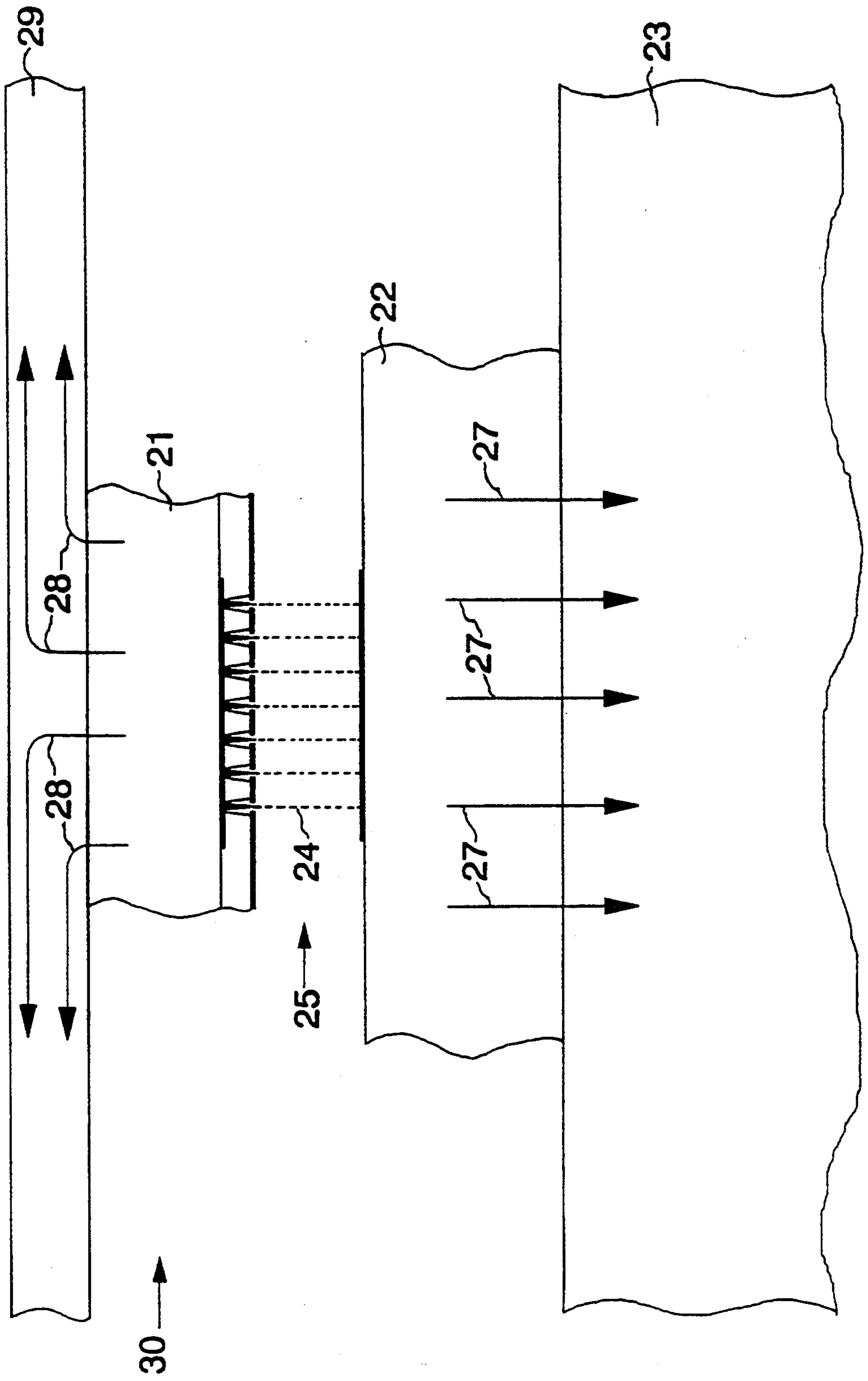

Referring now to FIG. 2*a* and FIG. 2*b*, there is shown an improved focal plane array 20 constructed in accordance with the principles of the present invention. FIG. 2*a* is an enlarged side view of a slice through a portion of the focal plane array 20 showing a portion of a detector means, a portion of a readout means and a non-contact interconnect means for interconnecting the detector means and readout means. The detector means is any suitable detector for receiving radiation and generating a signal in response thereto. In the embodiment of FIG. 2*a*, the detector means is illustrated by detector 21 which is a thermally sensitive pyroelectric or bolometric material and has no detector heat sink. The readout means is any suitable means for receiving the signal generated by the detector, such as readout amplifier or transimpedience amplifier. In the embodiment of FIG. 2*a*, the readout means is illustrated by readout 22 and senses the photon or thermally generated charge on the detector means.

The focal plane array of the present invention further comprises means for supporting the detector means and readout means in close proximity with each other and without physical contact. In the embodiment of FIG. 2*a*, the readout 22 is in intimate thermal contact with its heat sink 23 and detector 21 is suspended from its edges in any suitable manner. Arrows 26 show the heat flow from the detector 21. Arrows 27 show the heat flow from the readout 22 to the readout heat sink 23.

The focal plane array also comprises a non-contact interconnect means which is any suitable means for causing the signal generated by the detector means to be readout, without physical contact between the detector and the readout. In the embodiment of FIG. 2*a*, the non-contact interconnect means 25 comprises one or more vacuum microelectronics devices ("VMD") which produce electron beams 24, when biased, which are proportional to the intensity of the impinging radiation on the detector 21. These will be described in more detail below.

Figure 2C:
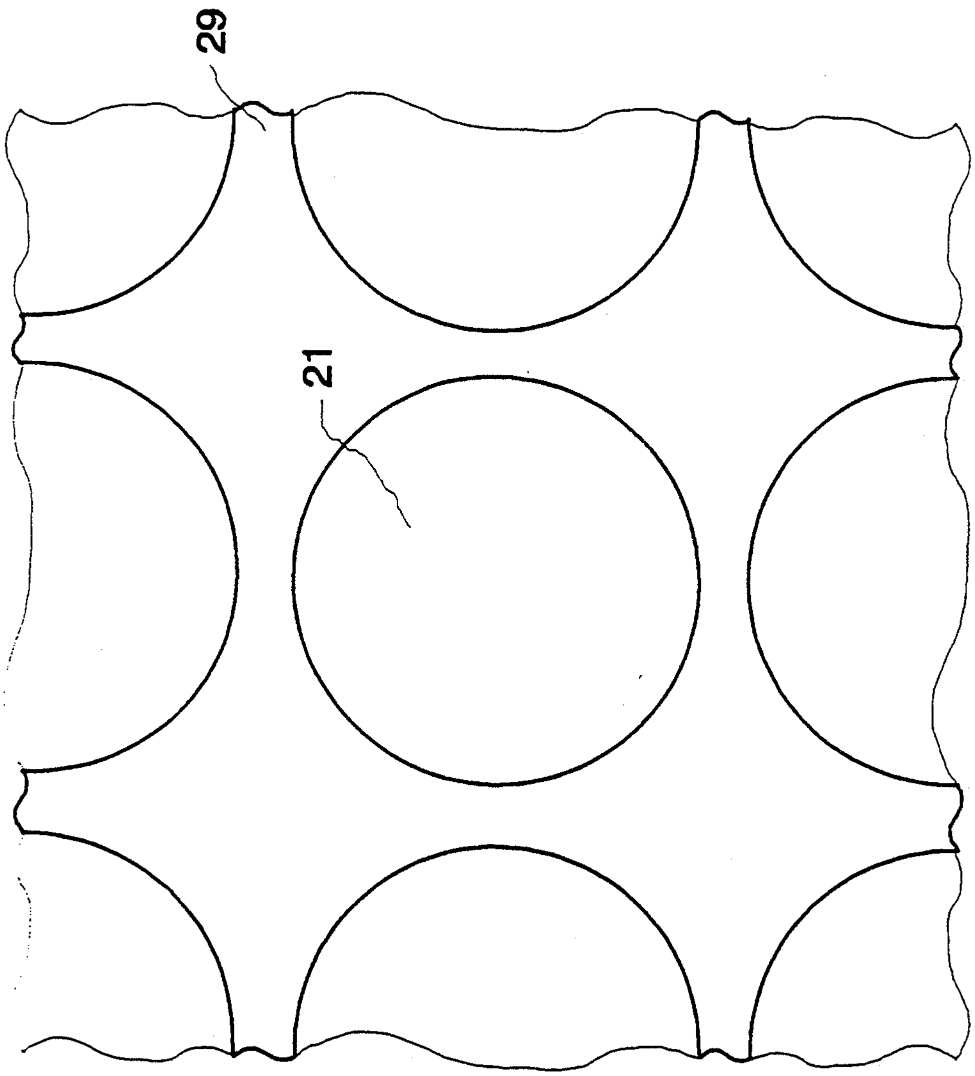

In the embodiment of FIG. 2*b*, a detector array 30 has a separate detector heat sink 29 and a separate readout heat sink 23. In this embodiment of the invention, the detector 21 is an IR photon sensitive BIB, photovoltaic, or photoconductive detector, which requires cooling. The readout 22 is in intimate thermal contact with its heat sink 23, while the detector 21 is in intimate thermal contact with its heat sink 29. The detector heat sink 29 is made in such a way as to not obscure the active area of the detector 21, that is, the heat sink 29 is made annular in shape so as to surround the active area of the detector 21. For example, in an embodiment shown in FIG. 2*c*, an annular shaped heat sink 29 surrounds the detector element 21. Infrared radiation illuminates the detector 21 from the top as seen in FIG. 2*b*.

Instead of using the readout 22 as the heat sink for the detector 21 as in FIG. 1, the embodiment of FIG. 2*b* illustrates that both the detector 21 and readout 22 have their own heat sinks with their own temperature controls. The readout 22 may thus be operated at a higher temperature than the detector 21. Typically, for BIB detectors, the readout 22 is maintained at a temperature above 40 degrees Kelvin, while the detector 21 is maintained at about 10 degrees Kelvin.

Arrows 28 in FIG. 2*b* show the heat flow from the detector 21 to the detector heat sink 29. Arrows 27 show the heat flow from the readout 22 to the readout heat sink 23.

In the embodiment of the invention illustrated in FIGS. 2*a* and 2*b*, the VMD electron beam current is modulated by the IR generated signal from the detector which is sensed by the readout 22. In this embodiment, the readout circuit may be one of many circuits commonly used to sense photogenerated current, such as switched FET. In another embodiment, an amplification device, such as a microchannel plate, can be used which excites phosphors on a display device.

In accordance with the principles of the present invention, the non-contact interconnect 25 between the detector 21 and the readout 22 provides no thermally conductive path from the readout 22 to the detector 21. High thermal resistance to heat flow 26 through the detector 21 in FIG. 2*a* allows thermal detectors, such as pyroelectric and bolometric detectors, to experience larger changes in temperature as a result of exposure to infrared radiation. This feature produces increased thermal detector response. The non-contact interconnect 25 also enables a desired thermal gradient to be maintained between the detector 21 and the readout 22 in cryogenically cooled systems. This feature reduces noise in the readout 22 and permits a net savings in refrigerator power.

In addition, the present invention eliminates the process of bonding the detector 21 to the readout 22, such as by the indium bump shown in FIG. 1. This increases yield and reduces the cost of focal plane arrays. Also, because there is no physical contact between the readout and detector, the problem of thermal expansion mismatch is eliminated and, thus, reliability is increased.

Referring now to FIG. 3, there is shown another embodiment of a focal plane array 40. In this embodiment, a cathode of a non-contact interconnect is constructed on the readout 22, instead of the detector 21. FIG. 3 is an enlarged side view of a slice through a portion of the focal plane array 40 showing a portion of a detector 21, a portion of a readout 22 and a non-contact interconnect means 41. Electron beams 42 emitted from the cathode are illustrated therebetween. In this embodiment, the benefits of thermal isolation provided by the non-contact interconnect are the same as those described above. In addition, a means of non-destructively testing conventional detector arrays, i.e. those with indium bumps as shown in FIG. 1, is provided.

Referring now to FIG. 4, an enlarged side view of the non-contact interconnect 41, illustrated in FIG. 3, is shown. The non-contact interconnect means 41 comprises one or more vacuum microelectronics devices (VMDs) 41*a*. The VMD comprises a cathode 44, a gate 43, and an interlayer dielectric 45. In the illustrated embodiment, the cathode is fabricated having a very sharply pointed cathode tip 47. When the gate 43 is biased to a voltage sufficiently high to cause electron tunneling from the cathode tip 47, an electron beam 42 is produced which traverses the space between the readout 22 and the detector 21 and impinges on the anode 46. The voltage on the gate 43 must be positive relative to the cathode tip 47 and produce an electric field sufficient to cause tunneling from the cathode tip 47. In this embodiment, the electric field sufficient to cause electron tunneling is approximately $5\times10^7$ V/cm. The current of the electron beam 42 from the VMD 41*a* is related to the gate-to-electrode voltage by the Fowler-Nordheim equation:

$$I_c = aVgc^2 e^{(b/Vgc)}$$

where $I_c$ is the cathode electron beam current 42, $V_{gc}$ is the gate-to-electrode voltage, and a and b are factors related to the cathode tip 47 geometry and materials.

In this embodiment of the invention, anode 46 also serves as an electrode of the detector 21. A charge builds up on the anode 46 which is proportional to the intensity of the impinging radiation on detector 21. The interconnect means is activated and the electron beam 42 acts to reset the detector 21 producing a displacement current proportional to the IR generated charge which can be sensed by a suitable amplifier circuit 49 connected to the detector bias electrode 48. An IR image can be constructed, for example, by matrix switching an array of non-contact interconnects, sensing the current on the detector bias electrode with a suitable amplifier, and using the signals to modulate the intensity of a display device such as a cathode ray tube.

In an alternate embodiment of the present invention, the non-contact interconnect means utilizes an ion beam or a photon beam, i.e. a laser beam, to cause the charge generated on the detector means to be measured. In still another embodiment, the non-contact interconnect means interconnects the signal generated by the detector means to the readout means through an electric field, such as by capacitance coupling. Also, the non-contact interconnect means comprises magnetic coupling.

Referring now to FIG. 5, a focal plane array 60 is illustrated in accordance with another embodiment of the present invention. Focal plane array 60 comprises a VMD 61 constructed so that a gate electrode 43 is connected to a detector electrode 62. In the embodiment shown in FIG. 5, the VMD structure 61 is fabricated by depositing an additional dielectric layer 63 on the detector electrode 62 and etching a via 64 through dielectric layers 45 and 63 so that contact is made between the gate electrode 43 and the detector electrode 62. In this embodiment, the non-contact interconnect means is connected so that the IR generated signal modulates the voltage on the gate of the VMD. Because the electron beam current 42 is related to the voltage on the gate 43 as described above, the non-contact interconnect means can be used to amplify the photocurrent before it is sensed by the readout circuit. This amplification results in higher sensitivity.

Thus, there has been described a new and improved interconnect for an infrared focal plane array. The lack of physical contact between the detector and readout of the present invention enables the two devices to operate at different temperatures. This increases the responsivity of thermal detectors by allowing larger temperature changes as a result of exposure to IR. For cryogenically cooled detectors, the readout of a focal plane array is enabled to operate at a higher temperature which is more desirable, while allowing the detector to operate at its optimum temperature. This results in less readout noise. The readout is maintained at a higher temperature than in a conventional focal plane array. This reduces the required refrigerator capacity, thus effecting power and weight savings. Since readout noise typically increases monotonically as the temperature is decreased, for temperatures below about 50 degrees Kelvin, by operating the readout at a higher temperature than the 10–20 degrees Kelvin typical of arsenic doped silicon (Is:As) BIB or gallium doped silicon (Is:Ga) BIB detectors, the present invention provides for significant noise reduction.

The lack of physical contact allows the detector and readout to expand to different sizes without stress or failure of the electrical connection provided by the non-contact interconnects. Thus, the reliability of the focal plane is increased. And, because the hybridization process is eliminated, the focal plane array production cost is reduced and the yield is increased.

It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A detecting apparatus for detecting electromagnetic radiation for generating an image, said detecting apparatus comprising:

a detector means for detecting intensity of the radiation and generating an electrical signal responsive thereto;

a readout means for receiving said electrical signal generated by said detector means and producing an electronic signal which can be converted into an image;

means for supporting said detector means and readout means without physical contact between said detector means and said readout means; and a non-contact interconnect means for causing said electrical signal generated by said detector means to be readout without physical contact between said detector means and said readout means, said non-contact interconnect means comprising means for generating a particle beam which is proportional to said electrical signal generated by said detector means.

2. The detecting apparatus of claim 1, wherein said means for generating a particle beam generates an electron beam.

3. The detecting apparatus of claim 1 wherein, said non-contact interconnect means comprises:

a cathode means for generating a beam of electrons, said cathode means comprises a conductive layer disposed on a surface of said detector means, an insulating layer disposed on the detector surface over said conductive layer and at least one conductive tip disposed on said conductive layer through openings patterned in the insulating layer;

a gate means for generating an electric field, said gate means comprising a conductive layer disposed on said insulating layer and patterned so as to surround said at least one conductive tip; and an anode comprising a conductive layer disposed on a surface of said readout means.

4. The detecting apparatus of claim 1, wherein said non-contact interconnect means comprises:

a detector electrode comprising a conductive layer disposed on a surface of said detector means;

a first insulating layer disposed on said surface of said detector means over said detector electrode;

a cathode comprising a conductive layer disposed on said first insulating layer;

a second insulating layer disposed on said cathode;

at least one conductive tip disposed on the cathode through opening patterned in said second insulating layer;

a gate comprising a conductive layer disposed on said second insulating layer and patterned so as to surround said at least one cathode tip in close proximity and making contact to said detector electrode layer; and an anode comprising a conductive layer disposed on a surface of said readout means.

5. The detector apparatus claim 1, further comprising:

a first temperature-controlled heat sink which is physically contactable with said detector means; and second temperature-controlled heat sink which is physically contactable with said readout means.

6. A focal plane array for detecting electromagnetic radiation for generating an image, said focal plane array comprising:

a detector means array for detecting intensity of the radiation and for generating an electrical signal responsive thereto;

a readout means array for receiving said electrical signal generated by said detector means and producing an electronic signal which can be converted into an image;

means for supporting said detector means array and readout means array without physical contact between said detector means array and said readout means array; and a non-contact interconnect means for causing said electrical signal generated by said detector means array to be readout without physical contact between said detector means array and said readout means array, said non-contact interconnect means comprising means for generating a particle beam which is proportional to said electrical signal generated by said detector means array.

7. The focal plane array of claim 6, wherein said means for generating a particle beam generates an electron beam.

8. The focal plane array of claim 6, further comprising:

a first temperature-controlled heat sink which is physically contactable with said detector means array; and second temperature-controlled heat sink which is physically contactable with said readout means array.

9. The focal plane array of claim 6, wherein said non-contact interconnect means comprises:

a cathode means for generating a beam of electrons, said cathode means comprises a conductive layer disposed on a surface of said detector means array, an insulating layer disposed on the surface of said detector means array over said conductive layer and at least one conductive tip disposed on said conductive layer through opening patterned in the insulating layer;

a gate means for generating an electric field, said gate means comprising a conductive layer disposed on said insulting layer and patterned so as to surround said at least one conductive tip; and an anode comprising a conductive layer disposed on a surface of said readout means array.

10. A detecting apparatus for detecting electromagnetic radiation for generating an image, said detecting apparatus comprising:

a detector means for detecting intensity of the radiation and generating an electrical signal responsive thereto;

a non-contact interconnect means for causing said electrical signal generated by said detector means to be readout without physical contact with said detector means, said non-contact interconnect means comprising means for generating a particle beam which impinges on said detector means and causes said electrical signal generated by said detector means to be received by a readout device;

means for supporting said detector means and non-contact interconnect means without physical contact between said detector means and said non-contact means.

11. A detecting apparatus for detecting electromagnetic radiation for generating an image, said detecting apparatus comprising:

a detector means for detecting intensity of the radiation and generating an electrical signal responsive thereto;

a readout means for receiving said electrical signal generated by said detector means and producing an electronic signal which can be converted into an image;

means for supporting said detector means and readout means without physical contact between said detector means and said readout means; and a non-contact interconnect means for causing said electrical signal generated by said detector means to be readout without physical contact between said detector means and said readout means, said non-contact interconnect means comprising means for generating a particle beam which is proportional to said electrical signal generated by said detector means and wherein said non-contact interconnect means comprises a vacuum microelectronics device.

12. A focal plane array for detecting electromagnetic radiation for generating an image, said focal plane array comprising:

a detector means array for detecting intensity of the radiation and for generating an electrical signal responsive thereto;

a readout means array for receiving said electrical signal generated by said detector means and producing an electronic signal which can be converted into an image;

means for supporting said detector means array and readout means array without physical contact between said detector means array and said readout means array; and a non-contact interconnect means for causing said electrical signal generated by said detector means array to be readout without physical contact between said detector means array and said readout means array, said non-contact interconnect means comprising means for generating a particle beam which is proportional to said electrical signal generated by said detector means array and wherein said non-contact interconnect means comprises a vacuum microelectronics device.

* * * * *